United States Patent [19]

Yatsu et al.

[11] Patent Number: 4,731,433

[45] Date of Patent: Mar. 15, 1988

[54] AROMATIC COPOLYESTER DERIVED FROM AROMATIC DICARBOXYLIC ACID COMPONENT AND AROMATIC DIOL COMPONENT

[75] Inventors: Tadao Yatsu, Iwakuni; Takayuki Nakano, Ohtake; Toshiki Sotoyama, Ichihara, all of Japan

[73] Assignee: Mitsui Petrochemical Industries, Ltd., Tokyo, Japan

[21] Appl. No.: 761,900

[22] Filed: Aug. 2, 1985

[30] Foreign Application Priority Data

| Aug. 3, 1984 [JP] | Japan | 59-162800 |
| Aug. 7, 1984 [JP] | Japan | 59-164223 |
| Aug. 7, 1984 [JP] | Japan | 59-164224 |
| Aug. 7, 1984 [JP] | Japan | 59-164225 |

[51] Int. Cl.$^4$ ............................................. C08G 63/12
[52] U.S. Cl. ................................ 528/193; 528/125; 528/173; 528/190; 528/194; 528/271
[58] Field of Search ............. 528/193, 194, 190, 173, 528/125, 271

[56] References Cited

U.S. PATENT DOCUMENTS

| 3,036,991 | 5/1962 | Kantor et al. | 528/193 |
| 4,064,108 | 12/1977 | Inata et al. | 528/193 |
| 4,275,188 | 6/1981 | Berger et al. | 528/193 |
| 4,362,858 | 12/1982 | Shimizu et al. | 528/179 |
| 4,412,058 | 10/1983 | Siemionko | 528/193 |
| 4,426,511 | 1/1984 | Asada et al. | 528/193 |
| 4,440,920 | 4/1984 | Fujikake et al. | 528/193 |
| 4,487,916 | 12/1984 | Irwin | 528/193 |
| 4,552,947 | 11/1985 | Iwakiri et al. | 528/193 |

FOREIGN PATENT DOCUMENTS

| 50821 | 5/1982 | European Pat. Off. . |
| 56149 | 7/1982 | European Pat. Off. . |
| 93891 | 11/1983 | European Pat. Off. . |

Primary Examiner—Harold D. Anderson
Attorney, Agent, or Firm—Sherman and Shalloway

[57] ABSTRACT

An aromatic copolyester comprising substantially equimolar proportions of [A] units derived from an aromatic dicarboxylic acid having 8 to 16 carbon atoms, and [B] units derived from an aromatic diol component; characterized in that (I) the diol component [B] is composed of 20 to 95 mole %, based on the total moles of compounds (a) and (b) below, of (a) a bisphenol compound represented by the formula

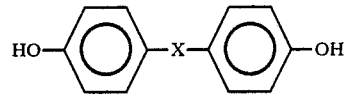

wherein X represents a direct bond, or a divalent group selected from the class consisting of $C_1$–$C_8$ alkylidene groups, O, S, SO, $SO_2$ and CO, and (b) 5 to 80 mole %, based on the total moles of the compounds (a) and (b), of a compound selected from the group consisting of a specific divalent phenolic compound, and (II) the aromatic copolyester has an intrinsic viscosity [η], determined at 60° C. in pentafluorophenol, of at least 0.4 dl/g.

11 Claims, No Drawings

AROMATIC COPOLYESTER DERIVED FROM AROMATIC DICARBOXYLIC ACID COMPONENT AND AROMATIC DIOL COMPONENT

This invention relates to an aromatic copolyester derived from an aromatic dicarboxylic acid component and an aromatic diol component, which is not described in the known literature and has excellent heat resistance and hydrolysis resistance.

More specifically, this invention relates to an aromatic copolyester comprising substantially equimolar proportions of [A] units derived from an aromatic dicarboxylic acid having 8 to 16 carbon atoms, and [B] units derived from an aromatic diol component; characterized in that (I) the diol component [B] is composed of 20 to 95 mole%, based on the total moles of compounds (a) and (b) below, of (a) a bisphenol compound represented by the formula

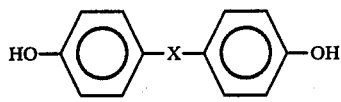

wherein X represents a direct bond, or a divalent group selected from the class consisting of $C_1$–$C_8$ alkylidene groups, O, S, SO, $SO_2$ and CO, and (b) 5 to 80 mole%, based on the total moles of the compounds (a) and (b), of a compound selected from the group consisting of (b-1) a divalent phenolic compound represented by the formula

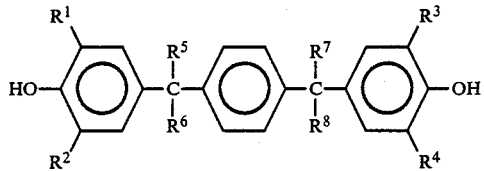

wherein each of $R^1$, $R^2$, $R^3$, $R^4$, $R^5$, $R^6$, $R^7$ and $R^8$ represents a hydrogen atom or a lower alkyl group, (b-2) a dihydric phenol compound represented by the formula

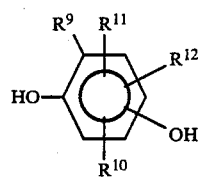

wherein each of $R^9$ and $R^{10}$ represents a lower alkyl group, and each of $R^{11}$ and $R^{12}$ represents a hydrogen atom or a lower alkyl group, (b-3) a divalent phenol compound represented by the formula

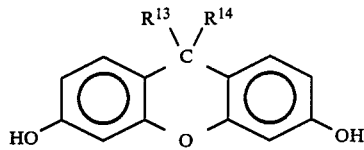

wherein each of $R^{13}$ and $R^{14}$ represents a hydrogen atom, a lower alkyl group or a phenyl group, (b-4) a dihydric phenol compound represented by the formula

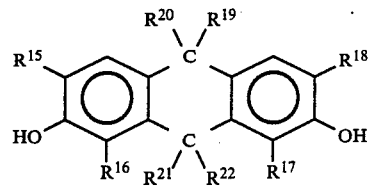

wherein each of $R^{15}$, $R^{16}$, $R^{17}$ and $R^{18}$ represents a lower alkyl group, and each of $R^{19}$, $R^{20}$, $R^{21}$ and $R^{22}$ represents a hydrogen atom, a lower alkyl group or a phenyl group, and (b-5) a dihydric phenol compound represented by the formula

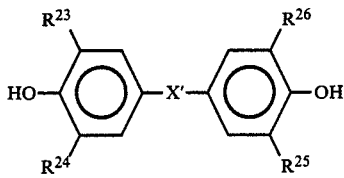

wherein each of $R^{23}$, $R^{24}$, $R^{25}$ and $R^{26}$ represents a hydrogen or a lower alkyl group provided that at least one of $R^{23}$ to $R^{26}$ is a lower alkyl group, and X' represents O or S, and (II) the aromatic copolyester has an intrinsic viscosity [$\eta$], determined at 60° C. in pentafluorophenol, of at least 0.4 dl/g.

Many proposals have heretofore been made on heat-resistant aromatic polyesters or copolyesters derived from an aromatic dicarboxylic acid component such as terephthalic acid or isophthalic acid and an aromatic diol component such as bisphenols, for example in J. Polymer Science, 40, 399 (1959), Visokomol. Soyed, 1, 834 (1959), Japanese Patent Publication No. 15247/1963 (corresponding to British Pat. No. 924,607), British Pat. No. 897,640, Japanese Patent Publication No. 5599/1962 (corresponding to U.S. Pat. No. 3,133,898), and Japanese Laid-Open Patent Publications Nos. 73021/1982, 96019/1982, 111317/1982, and 180525/1983. These known aromatic polyesters or copolyesters have the defect of inferior hydrolysis resistance at high temperatures. For example, poly(isopropylidene-4,4'-diphenylene isophthalate terephthalate) which has already come into commercial production readily undergoes hydrolysis in an atmosphere where water is present at high temperatures, for example in boiling water, and are drastically reduced in performance. Thus, the conventional aromatic polyesters or copolyesters have the defect that they have inferior hydrolysis resistance at high temperatures, and are susceptible to hydrolysis during molding or during use at high temperatures.

The present inventors have made extensive investigations in order to provide an aromatic copolyester which can overcome the aforesaid technical trouble or defect. These investigations have now led to the discovery that an aromatic copolyester comprising substantially equimolar proportions of [A] units derived from an aromatic dicarboxylic acid component having 8 to 16 carbon atoms and [B] units derived from an aromatic diol wherein the aromatic diol component consists essentially of at least two specific aromatic diol components (a) and (b) in specified proportions exhibit excellent heat resistance and hydrolysis resistance.

It is an object of this invention therefore to provide a novel aromatic copolyester having excellent heat resistance and hydrolysis resistance and derived from an aromatic dicarboxylic acid component and an aromatic diol component.

The above and other objects of this invention along with its advantages will become apparent from the following description.

In the present invention, aromatic dicarboxylic acids having 8 to 16 carbon atoms are used as the aromatic dicarboxylic acid component [A]. These ester-forming aromatic dicarboxylic acids are well known per se, and can be used in the production of the aromatic copolyester of this invention. The component [A] may be aromatic dicarboxylic acids having 8 to 16 carbon atoms, and functional derivatives thereof such as acid halides and aryl esters (e.g., phenyl or triphenyl esters). Specific examples include terephthalic acid, isophthalic acid, orthophthalic acid, 2,6-naphthalenedicarboxylic acid, 4,4-biphenyldicarboxylic acid, mixtures of at least two of these acids, and the functional derivatives thereof. Preferred units [A] derived from the aromatic dicarboxylic acid component are those derived from a component selected from the group consisting of terephthalic acid, isophthalic acid and a mixture of both. The units derived from a mixture of both are especially preferred.

In the present invention, the aromatic diol component [B] is composed of 20 to 95 mole% of the bisphenol compound (a) and 5 to 80 mole% of the dihydric phenol compound (b), the proportions being based on the total moles of the bisphenol compound (a) and the dihydric phenol compound (b) selected from the compounds (b-1) to (b-5) mentioned above. Preferably, it is composed of 25 to 90 mole%, more preferably 30 to 80 mole%, of the bisphenol compound (a) and 10 to 75 mole%, more preferably 20 to 70 mole%, of the dihydric phenol compound (b).

The bisphenol compound (a) is represented by the following formula

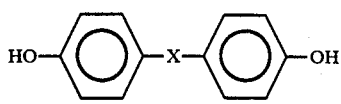

wherein X represents a direct bond or a divalent group selected from the class consisting of alkylidene groups having 1 to 8 carbon atoms, O, S, SO, $SO_2$ and CO.

Examples of the $C_1$-$C_8$ alkylidene groups are methylidene, ethylidene and propylidene. Specific examples of the bisphenol compound (a) are
4,4'-dihydroxydiphenyl,
bis(4-hydroxyphenyl)methane,
2,2-bis(4-hydroxyphenyl)propane,
2,2-bis(4-hydroxyphenyl)butane,
4,4'-cyclohexylidenediphenol,
1-phenyl-1,1-bis(4-hydroxyphenyl)ethane,
4,4'-dihydroxybenzophenone,
4,4'-dihydroxydiphenylether,
4,4'-thiodiphenol, and
bis(4-hydroxyphenyl)sulfone.

The dihydric phenol compound (b) is selected from the compounds (b-1) to (b-5).

The dihydric phenol compound (b-1) is represented by the following formula

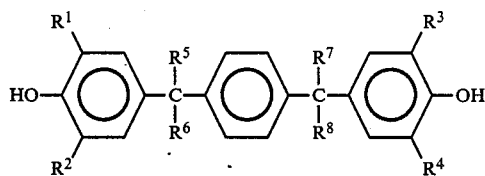

wherein each of $R^1$, $R^2$, $R^3$, $R^4$, $R^5$, $R^6$, $R^7$ and $R^8$ represents a hydrogen atom or a lower alkyl group.

In the above formula, the lower alkyl group may be an alkyl group having 1 to 3 carbon atoms such as methyl, ethyl and isopropyl. Specific examples of the dihydric phenol compound (b-1) include
1,3-bis(4-hydroxycumyl)benzene,
1,4-bis(4-hydroxycumyl)benzene,
1,3-bis(3,5-dimethyl-4-hydroxycumyl)benzene,
1,4-bis(3,5-dimethyl-4-hydroxycumyl)benzene,
1,3-bis(3,5-dimethyl-4-hydroxycumyl)benzene, and
1,4-bis(3,5-dimethyl-4-hydroxycumyl)benzene.

The dihydric phenol compound (b-2) is represented by the following formula

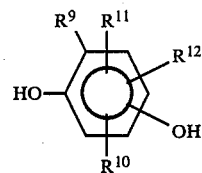

wherein each of $R^9$ and $R^{10}$ represents a lower alkyl group and each of $R^{11}$ and $R^{12}$ represents a hydrogen atom or a lower alkyl group.

The lower alkyl group in the above formula may be an alkyl group having 1 to 3 carbon atoms such as methyl, ethyl or isopropyl. Specific examples of the dihydric phenol compound (b-2) include
2,5-dimethylhydroquinone,
2,6-dimethylhydroquinone,
2-ethyl-5-methylhydroquinone,
2,4,6-trimethylresorcinol,
2,3,5,6-tetramethylhydroquinone,
2-isopropyl-5-methylhydroquinone, 2-ethyl-3,5,6-trimethylhydroquinone,
2,5-di-n-propylhydroquinone, and
2-n-propyl-3,5,6-trimethylhydroquinone.

The dihydric phenol compound (b-3) is represented by the following formula

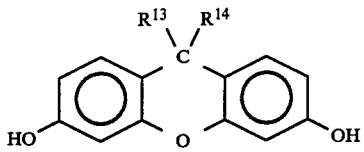

wherein each of $R^{13}$ and $R^{14}$ represents a hydrogen atom, a lower alkyl group or a phenyl group.

The lower alkyl group may be an alkyl group having 1 to 3 carbon atoms such as methyl, ethyl or isopropyl. Specific examples of the dihydric phenol compounds (b-3) includes
3,6-dihydroxyxanthene,
3,6-dihydroxy-9-methylxanthene,
3,6-dihydroxy-9,9-dimethylxanthene,
3,6-dihydroxy-9-methyl-9-ethylxanthene,
3,6-dihydroxy-9-methyl-9-isobutylxanthene, and
3,6-dihydroxy-9-methyl-9-phenylxanthene.

The dihydric phenol compound (b-4) is represented by the following formula

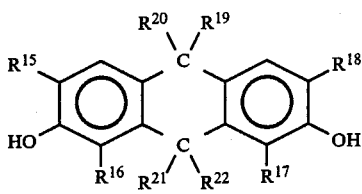

wherein each of $R^{15}$, $R^{16}$, $R^{17}$ and $R^{18}$ represents a lower alkyl group, and each of $R^{19}$, $R^{20}$, $R^{21}$ and $R^{22}$ represents a hydrogen atom, a lower alkyl group or a phenyl group.

The lower alkyl group in the above formula may, for example, be an alkyl group having 1 to 3 carbon atoms such as methyl, ethyl or isopropyl. Specific examples of such dihydric phenol compound (b-4) include
9,10-dihydro-2,4,5,7-tetramethyl-3,6-dihydroxyanthracene,
9-hydro-2,4,5,7,10,10-hexamethyl-3,6-dihydroxyanthracene,
2,4,5,7,9,10-hexamethyl-3,6-dihydroxyanthracene,
2,4,5,7,9,9,10,10-octamethyl-3,6-dihydroxyanthracene,
2,4,5,7,9,10,10-heptamethyl-9-ethyl-3,6-dihydroxyanthracene,
2,4,5,7,9,10-hexamethyl-9,10-diethyl-3,6-dihydroxyanthracene,
2,4,5,7,9,10,10-heptamethyl-9-phenyl-3,6-dihydroxyanthracene, and
2,4,5,7-tetraethyl-9,9,10,10-tetramethyl-3,6-dihydroxyanthracene.

The dihydric phenol compound (b-5) is represented by the following formula

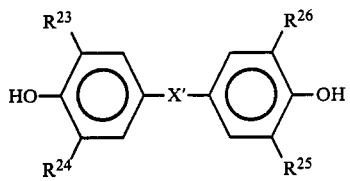

wherein each of $R^{23}$, $R^{24}$, $R^{25}$ and $R^{26}$ represents a hydrogen atom or a lower alkyl group provided that at least one of $R^{23}$ to $R^{26}$ is a lower alkyl group, and X' represents O or S.

The lower alkyl group may be an alkyl group having 1 to 3 carbon atoms such as methyl, ethyl or isopropyl. Specific examples of the dihydric phenol compound (b-5) are bis(3,5-dimethyl-4-hydroxyphenyl)ether and bis(3,5-dimethyl-4-hydroxyphenyl)sulfide.

The aromatic copolyesters of this invention consists of the units [A] derived from the aromatic dicarboxylic acid component and the units [B] derived from the aromatic diol component condensed in the alternately arranged state, and is a substantially linear high polymer as a result of formation of ester linkages. The molecular end of the copolyester may be a carboxyl group, or a hydroxyl group. Alternatively, the terminal carboxyl group may be esterified with a lower alcohol, or the terminal hydroxyl group may be esterified with a lower carboxylic acid.

The aromatic copolyester of this invention has an intrinsic viscosity [$\eta$], measured at 60° C. in pentafluorophenol, of at least 0.4 dl/g, preferably at least 0.5 dl/g, and a glass transition temperature of preferably at least 130° C., for example 130° to 300° C., more preferably 150° to 280° C. In addition to excellent heat resistance shown by the above glass transition temperature, the aromatic copolyester of this invention has an excellent hydrolysis resistance of, for example, at least 60%, preferably at least 65%, especially preferably at least 70%.

Means of producing polyesters from aromatic dicarboxylic acids and aromatic diols by utilizing known polyester-forming reactions such as solution polymerization, melt polymerization and interfacial polymerization are well known and established in the art, and can be utilized in the production of the aromatic copolyesters of this invention. They are briefly described below.

Melt-polymerization:

The aromatic dicarboxylic acid or its ester-forming derivative and the aromatic diol or its ester-forming derivative are reacted in the molten state at a high temperature, and low-boiling compounds formed as by-products by the reaction are removed from the reaction system by, for example, distillation under reduced pressure (see, for example, Japanese Patent Publication No. 15247/1963 corresponding to British Pat. No. 924,607). The reaction conditions may, for example, include agitation, a reaction temperature of about 250° to 400° C. and a reaction pressure of atmospheric pressure to 0.1 mmHg.

Solution polymerization:

A solution of the aromatic dicarboxylic acid or its ester-forming derivative or its acid halide and the aromatic diol or its ester-forming derivative is formed by using a high-boiling solvent such as diphenyl ether, benzophenone, meta-terphenyl, chlorinated biphenyl and brominated naphthalene. The solution is reacted at a high temperature, or if required in the presence of a basic compound such as a tertiary amine and N-methylpyrrolidone to promote the reaction (see, for example, Japanese Patent Publication No. 5599/1962 corresponding to U.S. Pat. No. 3,133,898 and British Pat. No. 966,483; Industrial and Engineering Chemistry, 51, 147 (1959)). The reaction conditions may, for example, include agitation, a reaction temperature of about 100° to 300° C., and a reaction pressure of atmospheric pressure to 0.1 mmHg.

Interfacial polymerization:

An acid halide of the aromatic dicarboxylic acid is dissolved in an organic solvent, and separately, the aromatic diol is converted to its metal salt such as sodium salt and dissolved in water. The two solutions are then brought into contact with each other to react on their interface the acid halide with the salt of the aromatic diol [see for example, J. Polym. Sci., 40, 399 (1959); British Pat. No. 897,640; Japanese Patent Publication No. 18399/1962; and Japanese Patent Publication No. 4996/1967). The reaction conditions include agitation, a reaction temperature of about 0° to 100° C., and a reaction pressure of atmospheric pressure.

Since the aromatic copolyesters of this invention have better heat resistance and hydrolysis resistance than conventional aromatic polyesters, their degradation during melt-molding and during use at high temperatures can be prevented.

The aromatic copolyesters of this invention can be used for example as component part of electrical and electronic instruments and appliances, automobiles, and precision instruments and appliances.

The following examples specifically illustrate the production of the aromatic copolyesters of this invention and their excellent properties.

In these examples, the amounts of the starting materials, solvents, catalysts and other materials used are indicated in parts by weight.

The glass transition point of the aromatic copolyester is determined by a differential scanning calorimeter.

The hydrolysis resistance of the aromatic copolyester is the percent retention of the intrinsic viscosity [η] of a molded article of the polyester immersed for 10 days in boiling water based on its initial intrinsic viscosity before immersion.

The heat distortion temperature of the aromatic copolyester was measured and determined in accordance with JIS K-6871.

The mechanical properties were measured and determined in accordance with the methods of JIS K-6745 and JIS K-6719.

EXAMPLE 1

A reactor was charged with 83 parts of terephthalic acid, 83 parts of isophthalic acid, 156 parts of 2,2-bis(4-acetoxyphenyl)propane, 243 parts of 1,4-bis(3,5-dimethyl-4-acetoxycumyl)benzene, 0.33 part of triphenyl phosphate and 0.1 part of tetrabutoxy titanate, and they were reacted at 250° at 270° C. under atmospheric pressure for about 2 hours with stirring in an atmosphere of nitrogen while distilling off acetic acid formed. Furthermore, over the course of about 2 hours, the pressure of the reaction system was gradually reduced, and its temperature was raised so that finally the pressure reached 0.7 mmHg and the temperature rose to 350° C. The resulting aromatic polyester had an intrinsic viscosity [η] of 0.75 dl/g, a glass transition temperature of 232° C., and a hydrolysis resistance of as high as 96%.

COMPARATIVE EXAMPLE 1

Example 1 was repeated except that 1,4-bis(3,5-dimethyl-4-acetoxycumyl)benzene was not used but 312 parts of 2,2-bis(4-acetoxyphenyl)propane was used. The resulting aromatic copolyesters had an intrinsic viscosity [η] of 0.68 dl/g, a glass transition temperature of 186° C., and a hydrolysis resistance of 48%.

EXAMPLES 2-8

Example 1 was repeated except that the aromatic dicarboxylic acids, aromatic binuclear bisphenol diacetates and aromatic trinuclear bisphenol diacetates indicated in Table 1 were used in the proportions indicated. The intrinsic viscosities, glass transition temperatures and hydrolysis resistances of the resulting aromatic polyesters are summarized in Table 1.

TABLE 1

| Example | Aromatic dicarboxylic acid Type | Amount (parts) | Aromatic binuclear bisphenol diacetate Type | Amount (parts) | Aromatic trinuclear bisphenol diacetate Type | Amount (parts) | Intrinsic viscosity [η] (dl/g) | Glass transition temperature (°C.) | Hydrolysis resistance (%) |
|---|---|---|---|---|---|---|---|---|---|
| 2 | Terephthalic acid Isophthalic acid | 83 83 | 2,2-bis(4-Acetoxyphenyl)-propane | 93.7 | 1,4-bis(3,5-Dimethyl-4-acetoxycumyl)benzene | 340.2 | 0.75 | 236 | 98 |
| 3 | Terephthalic acid Isophthalic acid | 83 83 | 2,2-bis(4-Acetoxyphenyl)-propane | 249.6 | 1,4-bis(3,5-Dimethyl-4-acetoxycumyl)benzene | 97.2 | 0.74 | 220 | 84 |
| 4 | Terephthalic acid 2,6-Naphthalene-dicarboxylic acid | 149.4 21.6 | 2,2-bis(4-Acetoxyphenyl)-propane | 156 | 1,4-bis(3,5-Dimethyl-4-acetoxycumyl)benzene | 243 | 0.69 | 230 | 96 |
| 5 | Terephthalic acid Isophthalic acid | 83 83 | 2,2-bis(4-Acetoxyphenyl)-propane | 93.6 | 1,4-bis(4-Acetoxycumyl)benzene | 301 | 0.70 | 218 | 85 |
| 6 | Terephthalic acid Isophthalic acid | 83 83 | 2,2-bis(4-Acetoxyphenyl)- | 93.6 | 1,3-bis(4-Acetoxycumyl)benzene | 301 | 0.75 | 215 | 82 |

TABLE 1-continued

| Example | Aromatic dicarboxylic acid | | Aromatic binuclear bisphenol diacetate | | Aromatic trinuclear bisphenol diacetate | | Intrinsic viscosity $[\eta]$ (dl/g) | Glass transition temperature (°C.) | Hydrolysis resistance (%) |
|---|---|---|---|---|---|---|---|---|---|
| | Type | Amount (parts) | Type | Amount (parts) | Type | Amount (parts) | | | |
| 7 | Terephthalic acid Isophthalic acid | 16.6 149.4 | 1-Phenyl-1,1-bis(4-acetoxy-phenyl)ethane propane | 187 | 1,4-bis(3,5-Di-methyl-4-acetoxy-cumyl)benzene | 243 | 0.71 | 236 | 96 |
| 8 | Terephthalic acid Isophthalic acid | 116.2 49.8 | 4,4'-Diacetoxy-diphenyl ether | 143 | 1,4-bis(3,5-Di-methyl-4-acetoxy-cumyl)benzene | 243 | 0.76 | 218 | 95 |

EXAMPLE 9

A reactor was charged with 83 parts of terephthalic acid, 83 parts of isophthalic acid, 156 parts of 2,2-bis(4-acetoxyphenyl)propane, 243 parts of 1,3-diacetoxy-2,4,6-trimethylbenzene, 0.33 part of triphenyl phosphate and 0.1 part of tetrabutoxy titanate. They were reacted at 250° to 270° C. under atmospheric pressure for 2 hours with stirring in an amosphere of nitrogen while distilling off acetic acid formed. Furthermore, over the course of 2 hours, the pressure of the reaction system was gradually reduced, and the temperature was raised so that finally, the pressure reached 0.7 mmHg and the temperature rose to 350° C. The resulting aromatic polyester had an intrinsic viscosity $[\eta]$ of 0.71 dl/g, a glass transition temperature of 190° C., and a hydrolysis resistance of 78%.

EXAMPLES 10–13

Example 9 was repeated except that the aromatic dicarboxylic acids, aromatic binuclear bisphenol diacetates and alkyl-substituted aromatic dihydric phenol diacetates indicated in Table 2 were used in the proportions indicated. The intrinsic viscosities, glass transition temperatures and hydrolysis resistances of the resulting aromatic polyesters are summarized in Table 2.

TABLE 2

| Example | Aromatic dicarboxylic acid | | Aromatic binuclear bisphenol diacetate | | Alkyl-substituted aromatic dihydric phenol diacetate | | Intrinsic viscosity $[\eta]$ (dl/g) | Glass transition temperature (°C.) | Hydrolysis resistance (%) |
|---|---|---|---|---|---|---|---|---|---|
| | Type | Amount (parts) | Type | Amount (parts) | Type | Amount (parts) | | | |
| 10 | Terephthalic acid Isophthalic acid | 83 83 | 2,2-bis(4-Acetoxyphenyl)-propane | 93.6 | 1,4-Diacetoxy-2,6-dimethyl-benzene | 155.4 | 0.73 | 189 | 79 |
| 11 | Terephthalic acid Isophthalic acid | 83 83 | 2,2-bis(4-Acetoxyphenyl)-propane | 249.6 | 1,4-Diacetoxy-2,3,6-trimethyl-5-ethylbenzene | 52.8 | 0.65 | 195 | 74 |
| 12 | Terephthalic acid Isophthalic acid | 83 83 | 1-Phenyl-1,1-bis(4-acetoxy-phenyl)ethane | 187 | bis(3,5-Dimethyl-4-acetoxyphenyl)-sulfide | 179 | 0.70 | 196 | 96 |
| 13 | Terephthalic acid Isophthalic acid | 83 83 | 4,4'-Diacetoxy-diphenyl ether | 143 | bis(3,5-Dimethyl-4-acetoxyphenyl)-ether | 171 | 0.73 | 180 | 87 |

EXAMPLES 14–16

An aromatic copolyester was produced by using each of the diols, each of the aromatic dicarboxylic acid dichlorides indicated in Table 3 in the proportions indicated.

An aqueous solution prepared by dissolving the diol indicated in Table 3, sodium hydroxide (82.8 parts), sodium hydrosulfiate (2 parts) and triethylbenzyl ammonium bromide (1.8 parts) in water (5000 parts) and a solution of the aromatic dicarboxylic acid dichloride indicated in Table 3 in methylene chloride (3000 parts) were contacted at 10° to 20° C. with stirring at high speeds to perform interfacial polymerization. Acetone was added to the reaction mixture to precipitate the resulting aromatic polyester, and the precipitate was isolated and recovered.

Table 3 summarizes the intrinsic viscosities, glass transition temperatures, heat distortion temperatures, tensile strengths and Izod impact strengths of the resulting aromatic polyesters.

TABLE 3

| Example | Aromatic dicarboxylic acid dichloride | | aromatic trinuclear diol acetate | | Intrinsic viscosity $[\eta]$ (dl/g) | Glass transition temperature (°C.) | Heat distortion temperature (°C.) | Tensile strength (kg/cm$^2$) | Izod impact strength (kg-cm/cm) | Hydrolysis resistance (%) |
|---|---|---|---|---|---|---|---|---|---|---|
| | Type | Amount (parts) | Type | Amount (parts) | | | | | | |
| 14 | Terephthaloyl dichloride | 203 | 3,6-Dihydroxy-9,9-dimethyl-xanthene 2,2-bis(4-Hydroxyphenyl)-propane | 121 114 | 0.83 | 231 | 198 | 730 | 19 | 81 |

TABLE 3-continued

| Example | Aromatic dicarboxylic acid dichloride Type | Amount (parts) | aromatic trinuclear diol acetate Type | Amount (parts) | Intrinsic viscosity [η] (dl/g) | Glass transition temperature (°C.) | Heat distortion temperature (°C.) | Tensile strength (kg/cm²) | Izod impact strength (kg-cm/cm) | Hydrolysis resistance (%) |
|---|---|---|---|---|---|---|---|---|---|---|
| 15 | Terephthaloyl dichloride | 203 | 3,6-Dihydroxy-9,9-dimethyl-xanthene | 60.5 | 0.80 | 254 | 196 | 709 | 17 | 77 |
|  |  |  | 2,2-bis(4-Hydroxyphenyl)-propane | 171 |  |  |  |  |  |  |
| 16 | Terephthaloyl dichloride | 101.5 | 3,6-Dihydroxy-9,9-dimethyl-xanthene | 121 | 0.82 | 240 | 197 | 700 | 24 | 75 |
|  | Isophthaloyl dichloride | 101.5 | 2,2-bis(4-Hydroxyphenyl)-propane | 114 |  |  |  |  |  |  |

EXAMPLES 17-21

Example 14 was repeated except that each of the diols and each of the aromatic dicarboxylic acid dichlorides indicated in Table 4 were used in the proportions indicated.

Table 4 summarizes the intrinsic viscosities, glass transition temperatures, heat distortion temperatures and hydrolysis resistances of the aromatic polyesters obtained.

A reactor was charged with each of the aromatic dicarboxylic acids, each of the diol acetates, triphenyl phosphate (0.33 parts) and tetrabutoxy titanate (0.1 part), and they were reacted at 250° to 310° C. under atmospheric pressure for about 1.5 hours with stirring in an atmosphere of nitrogen while distilling off acetic acid. Then, over the course of about 2 hours, the pressure of the reaction system was gradually reduced, and the temperature was raised so that finally the pressure reached about 1 mmHg and the temperature rose to 355° C.

Table 5 summarizes the intrinsic viscosities, glass transition temperatures and hydrolysis resistances of the resulting aromatic polyesters.

TABLE 4

| Example | Aromatic dicarboxylic acid dichloride Type | Amount (parts) | Diol Type | Amount (parts) | Intrinsic viscosity [η] (dl/g) | Glass transition temperature (°C.) | Heat distortion temperature (°C.) | Hydrolysis resistance (%) |
|---|---|---|---|---|---|---|---|---|
| 17 | Terephthaloyl dichloride | 203 | 3,6-Dihydroxy-9,9-dimethylxanthene | 121 | 0.72 | 248 | 203 | 73 |
|  |  |  | 1-Phenyl-1,1-bis(4-hydroxyphenyl)-ethane | 145 |  |  |  |  |
| 18 | Terephthaloyl dichloride | 203 | 3,6-Dihydroxy-9,9-dimethylxanthene | 121 | 0.84 | 252 | 214 | 79 |
|  |  |  | bis(4-Hydroxyphenyl)sulfone | 125 |  |  |  |  |
| 19 | Terephthaloyl dichloride | 142.1 | 3,6-Dihydroxy-9,9-dimethylxanthene | 121 | 0.84 | 246 | 206 | 84 |
|  | 2,6-Naphthalene dicarboxylic acid dichloride | 75.9 | 2,2-bis(4-Hydroxyphenyl)propane | 114 |  |  |  |  |
| 20 | Terephthaloyl dichloride | 203 | 3,6-Dihydroxyxanthene | 107 | 0.79 | 227 | 190 | 77 |
|  |  |  | 2,2-bis(4-Hydroxyphenyl)propane | 114 |  |  |  |  |
| 21 | Terephthaloyl dichloride | 202 | 3,6-Dihydroxy-9-methyl-9-phenyl-xanthene | 152 | 0.74 | 244 | 200 | 80 |
|  |  |  | 2,2-bis(4-Hydroxyphenyl)propane | 114 |  |  |  |  |

EXAMPLES 22-24

Aromatic copolyesters were produced by using the aromatic dicarboxylic acids and diol diacetates shown in Table 5 in the amounts indicated.

TABLE 5

| Example | Aromatic dicarboxylic acid Type | Amount (parts) | Diacetate of diol Type | Amount (parts) | Intrinsic viscosity [η] (dl/g) | Glass transition temperature (°C.) | Hydrolysis resistance (%) |
|---|---|---|---|---|---|---|---|
| 22 | Terephthalic acid | 83 | 2,4,5,7,9,9,10,10-Octamethyl-3,6-diacetoxyanthracene | 204 | 0.74 | 213 | 95 |
|  | Isophthalic acid | 83 | 2,2-bis(4-Acetoxyphenyl)propane | 156 |  |  |  |
| 23 | Terephthalic acid | 83 | 2,4,5,7,9,9,10,10-Octamethyl-3,6-diacetoxyanthracene | 102 | 0.76 | 208 | 86 |
|  | Isophthalic acid | 83 | 2,2-bis(4-Acetoxyphenyl)propane | 234 |  |  |  |
| 24 | Terephthalic acid | 166 | 2,4,5,7,9,9,10,10-Octamethyl-3,6-diacetoxyanthracene | 204 | 0.59 | 232 | 96 |

TABLE 5-continued

| Example | Aromatic dicarboxylic acid Type | Amount (parts) | Diacetate of diol Type | Amount (parts) | Intrinsic viscosity [η] (dl/g) | Glass transition temperature (°C.) | Hydrolysis resistance (%) |
| --- | --- | --- | --- | --- | --- | --- | --- |
| | | | anthracene 2,2-bis(4-Acetoxyphenyl)octapropane | 156 | | | |

EXAMPLES 25–29

Example 22 was repeated except that the aromatic dicarboxylic acids and diol diacetates indicated in Table 6 were used in the proportions indicated.

Table 6 summarizes the intrinsic viscosities, glass transition temperatures and hydrolysis resistances of the resulting aromatic polyesters of the resulting aromatic copolyesters.

TABLE 6

| Example | Aromatic dicarboxylic acid Type | Amount (parts) | Diacetate of diol Type | Amount (parts) | Intrinsic viscosity [η] (dl/g) | Glass transition temperature (°C.) | Hydrolysis resistance (%) |
| --- | --- | --- | --- | --- | --- | --- | --- |
| 25 | Terephthalic acid | 83 | 2,4,5,7,9,9,10,10-Octamethyl-3,6-diacetoxyanthracene | 204 | 0.70 | 218 | 95 |
| | Isophthalic acid | 83 | 1-Phenol-1,1-bis(4-acetoxyphenyl)-ethane | 187 | | | |
| 26 | Terephthalic acid | 83 | 2,4,5,7,9,9,10,10-Octamethyl-3,6-diacetoxyanthracene | 204 | 0.73 | 223 | 94 |
| | Isophthalic acid | 83 | bis(4-Acetoxyphenyl)sulfone | 167 | | | |
| 27 | Isophthalic acid | 149.4 | 2,4,5,7,9,9,10,10-Octamethyl-3,6-diacetoxyanthracene | 204 | 0.75 | 210 | 94 |
| | 2,6-Naphthalene-dicarboxylic acid | 21.6 | 2,2-bis(4-Acetoxyphenyl)propane | 156 | | | |
| 28 | Terephthalic acid | 83 | 9,10-Dihydro-2,4,5,7-tetramethyl-3,6-diacetoxyanthracene | 176 | 0.75 | 210 | 90 |
| | Isophthalic acid | 83 | 2,2-bis(4-Acetoxyphenyl)propane | 156 | | | |
| 29 | Terephthalic acid | 83 | 2,4,5,7,9,10,10-Heptamethyl-9-phenyl-3,6-diacetoxyanthracene | 235 | 0.67 | 219 | 95 |
| | Isophthalic acid | 83 | 2,2-bis(4-Acetoxyphenyl)propane | 156 | | | |

What is claimed is:

1. An aromatic copolyester comprising substantially equimolar proportions of (A) units derived from an aromatic dicarboxylic acid having 8 to 16 carbon atoms, and (B) units derived from an aromatic diol mixture, wherein said units are derived by the reaction between said dicarboxylic acid or an ester-forming derivative thereof with said diol component or an ester-forming derivative thereof; characterized in that (I) the diol mixture (B) is composed of 20 to 95 mole%, based on the total moles of compounds (a) and (b) below, of (a) a bisphenol compound represented by the formula (I)

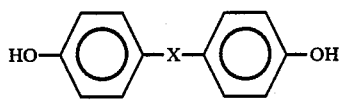

wherein X represents a divalent group selected from the class consisting of $C_1$–$C_8$ alkylidene groups, O, S, and $SO_2$, and (b) 5 to 80 mole%, based on the total moles of the compounds (a) and (b), of a dihydric phenol compound selected from the group consisting of (b-1) a divalent phenolic compound represented by the formula (II)

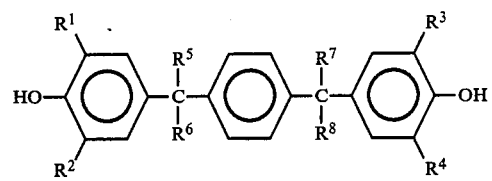

wherein each of $R^1$, $R^2$, $R^3$, $R^4$, $R^5$, $R^6$, $R^7$ and $R^8$ represents a hydrogen atom or a lower alkyl group, (b-3) a divalent phenol compound represented by the formula (III)

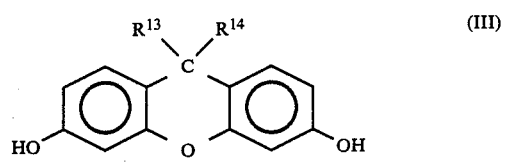

wherein each of $R^{13}$ and $R^{14}$ represents a hydrogen atom, a lower alkyl group or a phenyl group, and (b-4) a dihydric phenol compound represented by the formula (IV)

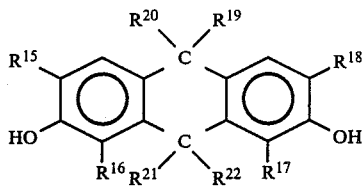

wherein each of $R^{15}$, $R^{16}$, $R^{17}$ and $R^{18}$ represents a lower alkyl group, and each of $R^{19}$, $R^{20}$, $R^{21}$ and $R^{22}$ represents a hydrogen atom, a lower alkyl group or a phenyl group, and (II) the aromatic copolyesters has an intrinsic viscosity ( ), determined at 60° C. in pentafluorophenol, of at least 0.4 dl/g, a glass transition temperature of from 208° C. to 254° C., and a hydrolysis resistance of from 73% to 98%.

2. The aromatic copolyester of claim 1 wherein the diol mixture (B) comprises the bisphenol compound of formula (I) and the divalent phenolic compound (b-1) of the formula (II).

3. The aromatic copolyester of claim 1 wherein the diol mixture (B) comprises the bisphenol compound of formula (I) and the divalent phenolic compound (b-3) of the formula (III).

4. The aromatic copolyester of claim 1 wherein the diol mixture (B) comprises the bisphenol compound of formula (I) and the dihydric phenol compound (b-4) of the formula (IV).

5. The aromatic copolyester of claim 1 wherein the diol mixture (B) is composed of 30 to 80 mole% of the bisphenol compound (a) and 70 to 20 mole% of the dihydric phenol compound (b).

6. The aromatic copolyester of claim 1 wherein the aromatic dicarboxylic acid is terephthalic acid, isophthalic acid or a mixture thereof.

7. The aromatic copolyester of claim 1 wherein the diol mixture (B) is a mixture consisting of (a) 2,2-bis(4-acetoxyphenyl)propane, 1-phenyl-1,1-bis(4-acetoxyphenyl)ethane or 4,4'-diacetoxyphenyl ether and (b) 1-4-bis(3,5-dimethyl-4-acetoxycumyl)benzene, 1,4-bis(4-acetoxycumyl)benzene or 1,3-bis(4-acetoxycumyl)benzene.

8. The aromatic copolyester of claim 1 wherein the diol mixture (B) is a mixture consisting of (a) 2,2-bis(4-hydroxyphenyl)propane and (b) 3,6-dihydroxy-9,9-dimethylxanthene.

9. The aromatic copolyester of claim 1 wherein the diol mixture (B) is a mixture consisting of (a) 1-phenyl-1,1-bis(4-hydroxyphenyl)ethane, bis(4-hydroxyphenylsulfone) or 2,2-bis(4-hydroxyphenyl)propane and (b) 3,6-dihydroxy-9-methyl-9-phenylxanthene.

10. The aromatic copolyester of claim 1 wherein the diol mixture (B) is a mixture consisting of (a) 2,2-bis(4-acetoxyphenyl)propane or 2,2-bis(4-acetoxyphenyl)octapropane and (b) 2,4,5,7,9,9,10,10-octamethyl-3,6-diacetoxyanthracene.

11. The aromatic copolyester of claim 1 wherein the diol mixture (B) is a mixture consisting of (a) 1-phenol-1,1-bis(4-acetoxyphenyl)ethane, bis(4-acetoxyphenyl)sulfone or 2,2-bis(4-acetoxyphenyl)propane and (b) 2,4,5,7,9,9,10,10-octamethyl-3,6-diacetoxyanthracene, 9,10-dihydro-2,4,5,7-tetramethyl-3,6-diacetoxyanthracene or 2,4,5,7,9,10,10-heptamethyl-9-phenyl-3,6-diacetoxyanthracene.

* * * * *

UNITED STATES PATENT AND TRADEMARK OFFICE
CERTIFICATE OF CORRECTION

PATENT NO. : 4,731,433
DATED : March 15, 1988
INVENTOR(S) : TADAO YATSU ET AL.

It is certified that error appears in the above-identified patent and that said Letters Patent is hereby corrected as shown below:

Claim 1, column 15, in the fifth line below the formula, "copolyesters" should read --copolyester--;

Claim 1, column 15, in the sixth line below the formula, "( )" should read --($\eta$)--.

Signed and Sealed this

Ninth Day of August, 1988

Attest:

DONALD J. QUIGG

Attesting Officer

Commissioner of Patents and Trademarks